Jan. 4, 1966    G. C. SCOTT    3,227,486
INFLATABLE AUTOMOBILE TOP
Filed March 19, 1962    2 Sheets-Sheet 1
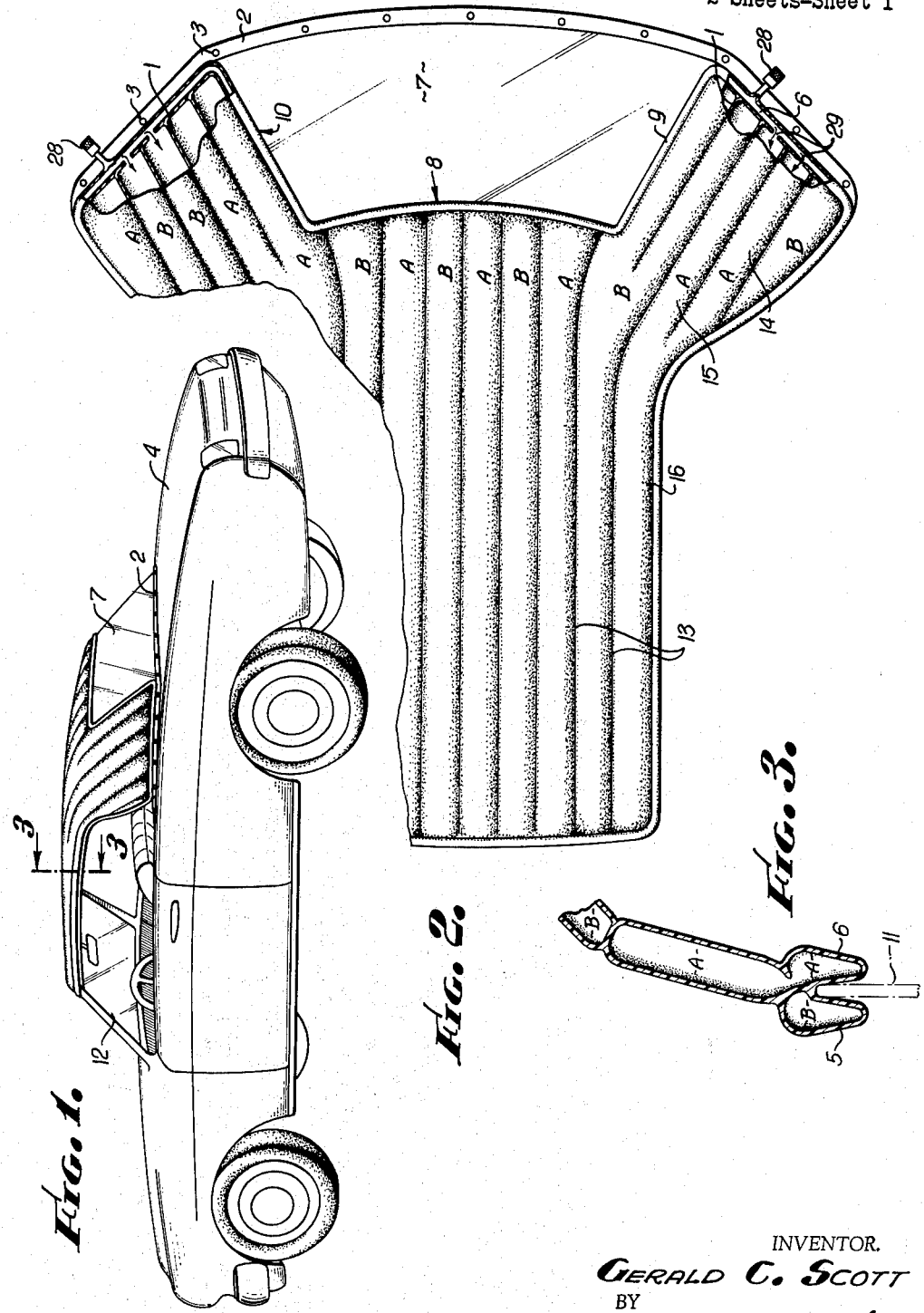
INVENTOR.
GERALD C. SCOTT
BY
Flam and Flam
ATTORNEYS.

Jan. 4, 1966     G. C. SCOTT     3,227,486
INFLATABLE AUTOMOBILE TOP
Filed March 19, 1962     2 Sheets-Sheet 2
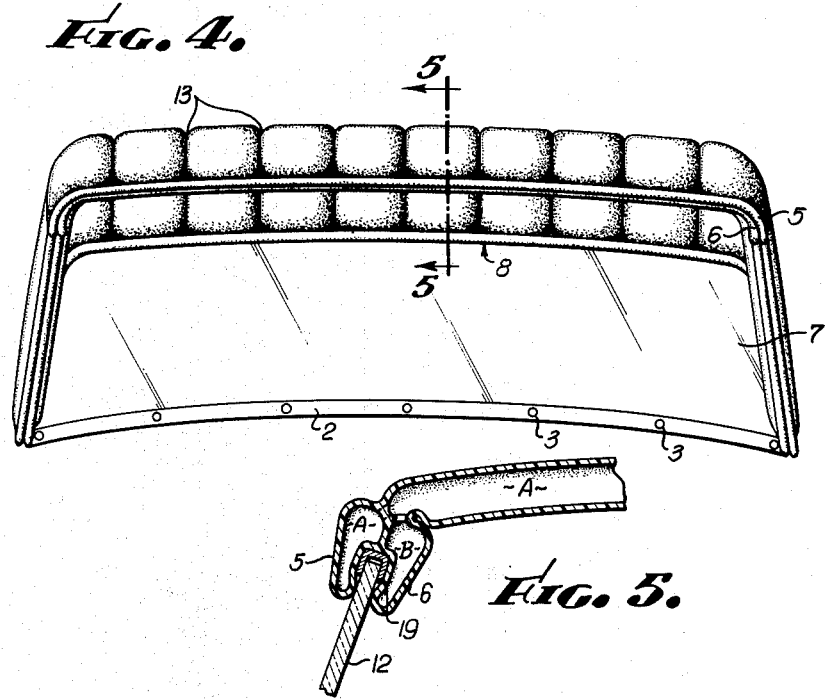
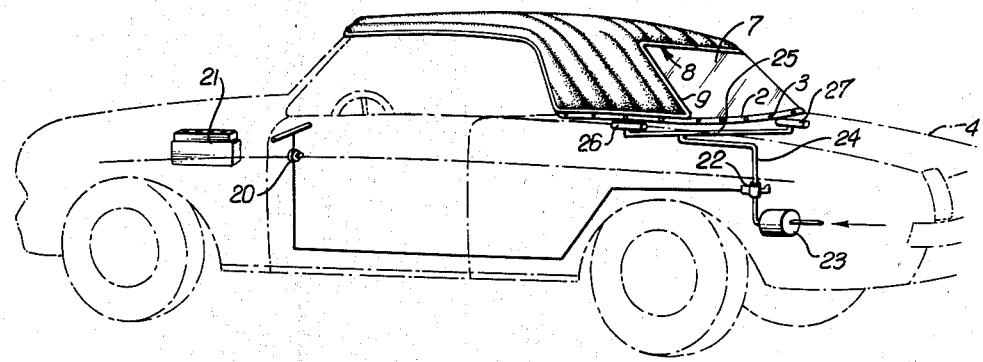
INVENTOR.
GERALD C. SCOTT
BY
Flam and Flam
ATTORNEYS.

United States Patent Office 3,227,486
Patented Jan. 4, 1966

3,227,486
INFLATABLE AUTOMOBILE TOP
Gerald C. Scott, Sacramento, Calif.
(920 N. Foothill Road, Beverly Hills, Calif.)
Filed Mar. 19, 1962, Ser. No. 180,463
2 Claims. (Cl. 296—117)

This invention relates to automobile tops, such as are commonly used for convertible cars.

Such tops are now conveniently made of stout fabric material, appropriately treated to make them waterproof. In extended position, this usual form of top is supported on a series of structural elements, such as bows and struts. Such elements often are provided with power means to move them to extended position. Accordingly, such top installations are quite expensive and are subject to frequent repair or replacement.

It is one of the objects of this invention to provide a top that can be simply and effectively extended without the aid of expensive equipment and yet that is capable of being stored in a small space.

In order to accomplish these results, the top is made hollow so as to inflatable; the air pressure may be such as to prevent any material deviation of the desired form when supported at its edges by the elements of the car body, such as the rear deck of the car behind the seats and the windshield, and reinforced by the upper edges of closed windows.

It is another object of this invention to provide two sets of air chambers, the chambers of each set extending longitudinally of the top and being interspersed with the chambers of the other set, whereby failure of pressure in one set will not cause collapse of the top, by virtue of the inflated chambers of the other set.

This invention possesses many other advantages, and has other objects which may be made more clearly apparent from a consideration of one embodiment of the invention. For this purpose, there is shown a form in the drawings accompanying and forming a part of the present specification, and which drawings, unless described as diagrammatic, or unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURE 1 is a pictorial view of an automobile equipped with an inflatable top incorporating the invention;

FIG. 2 is a developed view, partly broken away, of the inflatable top;

FIG. 3 is an enlarged detail cross section, taken along a plane corresponding to line 3—3 of FIG. 1;

FIG. 4 is a view taken from the front of the car shown in FIG. 1 but with many of the car elements omitted;

FIG. 5 is a sectional view taken along a plane corresponding to line 5—5 of FIG. 4; and FIG. 6 illustrates diagrammatically the manner in which compressed air may be supplied to the top, the car being shown in phantom lines.

The inflatable top is shown in extended, flat form in FIG. 2. It comprises inflatable chambers defined by wall means and designated generally by reference characters A and B. The wall means 1 for these chambers is formed by suitable, flexible, air tight material, such as rubberized fabric or the like which is commonly used for air mattresses or air cushions.

The rear edge 2 of the top may be provided with appropriate detachable fasteners 3 for attachment to the body 4 of the automobile adjacent the rear seat thereof. The angled portions of this rear edge 2 may be turned to the position shown in FIG. 1 and extended along the sides of the body at the rear seats.

A rear window 7 made of suitable plastic or the like may be attached at its rear end to the edge 2. Its upper end is attached to the border 8 having angled portions 9 and 10. These borders 8, 9 and 10 form continuous lip portions 5 and 6 illustrated in FIGS. 3 and 5. These lip portions are hollow and form grooves for the accommodation of the upper edges of the windows such as 11 shown in phantom in FIG. 3, or the windshield 12 of the automobile as shown in FIG. 5.

The creases 13 formed by the wall means to define the chambers A and B define a rib-like structure. Chambers A all communicate with each other to form a continuous closed space; and likewise chambers B also form a continuous closed space. These chambers A and B are interspersed, as shown most clearly in FIG. 2.

The chambers A connect with the interior of the hollow lip 6 which includes ports 29 leading to the chambers A.

The other lip 5 is similarly connected to all of the chambers B, as shown in the upper right hand portion of FIG. 2. The compressed air is fed to the lips 5 and 6 from any appropriate source to be hereinafter described. Since the chambers A and B are in communication respectively with the hollow lips 6 and 7 through substantially the entire periphery of the top, compressed air is passed to these chambers at both ends of these chambers by way of these lips.

As shown most clearly in FIG. 2, the adjacent portions 14 and 15 of chambers A merge into a common marginal chamber 16. Similarly, at the upper right hand portion of FIG. 2, portions 17 and 18 of chambers B merge along the right hand margin of the top. Of course this pattern of the formation of the chambers is but an example, as the choice of this pattern is governed to some extent by individual taste, as well as by difference in structural designs of the cars.

As shown most clearly in FIG. 5, the windshield 12 may be provided with a protective strip 19 which engages within the groove formed by the lips 5 and 6. This portion of the top may be attached by appropriate fasteners to the windshield 12. Snap fasteners similar to the fasteners 3 or other suitable types of fastening means which are known in the art may be used. The lips 5 and 6 along the edges of the inflatable top provide a satisfactory seal with the windows and windshield. Upon sufficient inflation of the top, no rigid framework is necessary to support the top in operative position. Furthermore, it is a simple matter by the aid of valves to deflate the top and fold it in a compact manner. However, if desired, reinforcement framework may be used, to provide additional strength against displacement of the top.

The source for the compressed air is indicated diagrammatically in FIG. 6. In this figure, a switch 20 placed on the dashboard or other convenient place in the automobile controls current from the car battery 21 to operate a control valve 22 which leads to a reservoir 23 for the compressed air. The reservoir 23 may be constantly supplied by a small compressor (not shown), or an outside source of compressed air such as from a filling station source.

A conduit 24 leads to a header 25 in turn communicating with the inlets 26 and 27 for the chambers A and B respectively. Check valves 28, such as used for tires, may be used to prevent deflation of the top. The inlets 26 and 27 lead respectively to these check valves. Should either set A or B deflated, the other set may be kept sufficiently inflated to keep the top in its desired extended form.

The inventor claims:

1. An inflatable automobile top cooperable with an automobile windshield, comprising: walls forming a plurality of inflatable chambers extending substantially in side by side relationship across the entire width of the top to define individual columns each extending substantially parallel to the length of the automobile, the walls forming the columns acting substantially as longitudinal beams resisting transverse flexure thereby providing form definition to the top without requiring any other reinforcement or supporting framework; said top having frontal peripheral portions formed as juxtaposed inflatable layers forming a groove for receiving the edge of the windshield.

2. An inflatable automobile top cooperable with an automobile windshield, comprising: walls forming a plurality of inflatable chambers extending substantially in side by side relationship across the entire width of the top to define individual columns each extending substantially parallel to the length of the automobile, the walls forming the columns acting substantially as longitudinal beams resisting transverse flexure thereby providing form definition to the top without requiring any other reinforcement or supporting framework; the front peripheral portions of the top being formed as juxtaposed inflatable layers forming a groove for receiving the edge of the windshield; other peripheral portions of the top also forming adjacent peripherally extending inflatable layers; there being two sets of said air columns communicating exclusively with one or the other of said layers whereby at least some of the columns remain operative if the other columns are deflated.

References Cited by the Examiner
UNITED STATES PATENTS

| | | | |
|---|---|---|---|
| 1,772,310 | 8/1930 | Hart | 5—348 |
| 2,448,054 | 8/1948 | Seckel | 296—107 |
| 2,747,929 | 5/1956 | Masano | 296—117 |
| 2,834,606 | 5/1958 | Bertrand | 280—150 |

BENJAMIN HERSH, *Primary Examiner.*

A. HARRY LEVY, PHILIP ARNOLD, *Examiners.*